Figure 1:
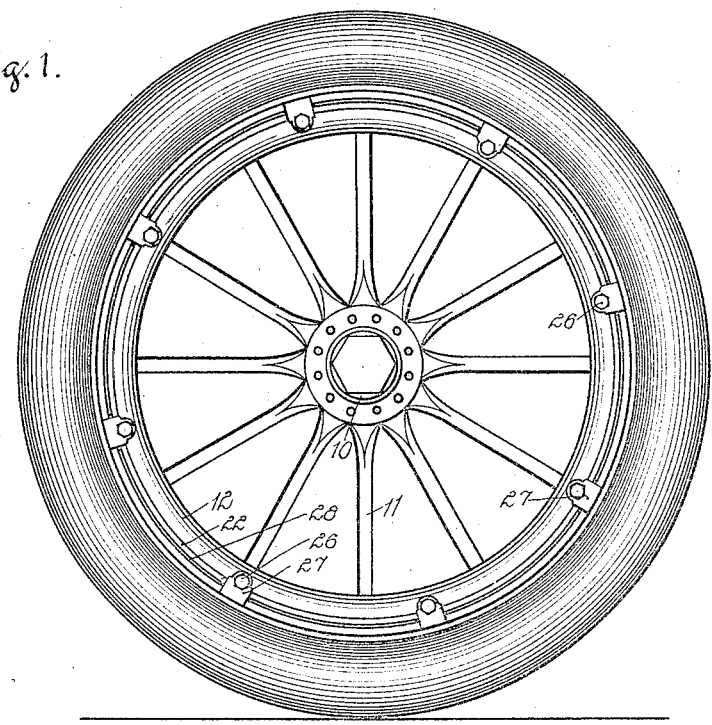

J. M. SCHEURICH.
VEHICLE WHEEL.
APPLICATION FILED FEB. 14, 1913.

1,132,039.

Patented Mar. 16, 1915.
2 SHEETS—SHEET 1.

Witnesses
Robert F. Bracke
Leslie M. Fricke

Inventor
Joseph M. Scheurich
BY Brown Williams Bell Harris & Boettcher
Attys.

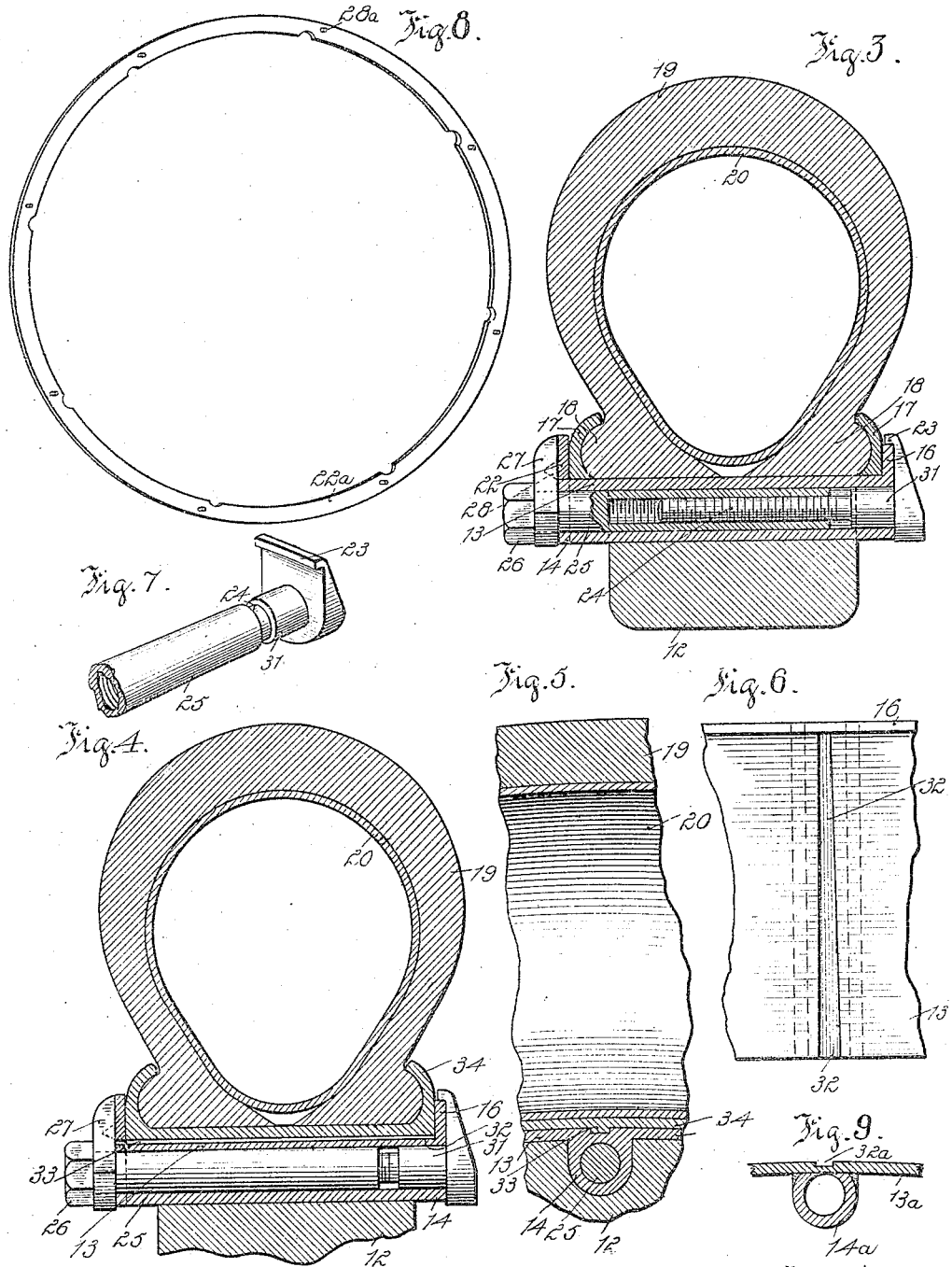

UNITED STATES PATENT OFFICE.

JOSEPH M. SCHEURICH, OF CHICAGO, ILLINOIS, ASSIGNOR OF ONE-HALF TO JOHN E. SCHEURICH, OF HOT SPRINGS, ARKANSAS.

VEHICLE-WHEEL.

1,132,039.            Specification of Letters Patent.        Patented Mar. 16, 1915.

Application filed February 14, 1913. Serial No. 748,271.

*To all whom it may concern:*

Be it known that I, JOSEPH M. SCHEURICH, a citizen of the United States, residing at Chicago, in the county of Cook and State of Illinois, have invented certain new and useful Improvements in Vehicle-Wheels, of which the following is a full, clear, concise, and exact description, reference being had to the accompanying drawings, forming a part of this specification.

My invention relates to vehicle wheels and its object is to provide a wheel structure which is of durable construction, and which can be economically manufactured.

My invention is particularly concerned with the provision of devices whereby vehicle tires of any of the standard types may be securely positioned and readily removed.

A particularly novel feature of the wheel of my invention is the fact that it is capable of being used with either the so-called "quick detachable tires" or with tires mounted upon the demountable rims.

Broadly, the wheel of my invention comprises a hub, spokes and felly, the particular conformation of which is not important so far as the present invention is concerned. Encircling the periphery of the felly is a rim preferably shrunk thereon and bolted in order that the connection between the felly and rim may be an inherently rigid one.

The inner surface of the rim is provided with a plurality of transverse lugs, which are disposed in suitable slots in the periphery of the felly when the said wheel rim is secured in position. Each of these lugs is provided with a longitudinal bore therethrough designed to receive the male and female portions of a locking device of peculiar conformation. The said rim is provided with an integral peripheral flange preferably located on the side of the wheel nearest the vehicle.

When the wheel rim is to be used as a "quick detachable rim" one of a pair of flying rings bears against the peripheral flange above mentioned. The said rings are conformed to be used with tires of any standard type, although in the illustrations I have shown tires of the so-called "clencher" type. Encircling the rim on the side of the tire opposite the vehicle is the other one of the said pair of flying rings, which when the wheel devices are in normal position, is carried by means of a novel locking device comprising a locking ring and male and female bolts disposed in the openings through the transverse lugs with which the wheel rim is provided. These bolts, when secured into engagement with each other, act between the inner edge of the rim and the said locking ring and so securely retain the tire and the flying rings in rigid relation to each other and the wheel rim. Owing to the peculiar conformation of the male and female bolts mentioned, a regular pneumatic tire casing may be filled with saw-dust, straw, rags, etc., in case the inner tube is blown out, then drawn up which packs the filling material in tight and fills up the casing. In this way the casing may be used independently of the inner tube without spoiling the said casing.

If it is desired that the wheel be adaptable for use with demountable rims the periphery of the wheel rim is provided with a plurality of transverse slots, preferably tapered, which are engaged by corresponding lugs formed upon the inner surface of a demountable rim. The demountable rim is forced into position and secured by means of the locking ring and bolts heretofore mentioned.

Figure 2:
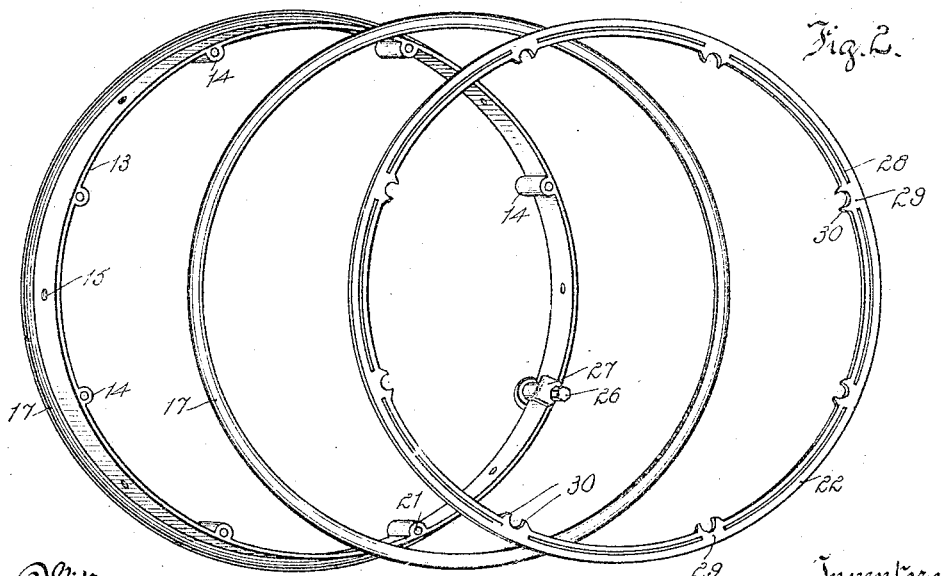

These, and other features of the device of my invention are set forth in detail in the following description, and are illustrated in the accompanying drawings in which:

Figure 1 is an elevational view of the wheel constructed in accordance with my invention. Fig. 2 is a disassembled view in perspective illustrating the wheel rim, the flying rings, and the locking devices. Fig. 3 is a transverse sectional view taken through the tire, wheel rim and felly. Fig. 4 is a view similar to Fig. 3 illustrating a wheel rim designed for the reception of a demountable rim. Fig. 5 is a vertical sectional view of the parts shown in Fig. 4. Fig. 6 is a fragmentary plan view of a wheel rim adapted for the reception of a demountable rim. Fig. 7 is a detail perspective view of the male and female locking bolts. Fig. 8 illustrates a modified form of locking ring and Fig. 9 is a fragmentary sectional view illustrating a form of wheel rim wherein the transverse lugs with which the rim is provided are formed thereon by fusing tubes transversely thereof.

Similar reference numerals refer to similar parts throughout the several views.

In the drawings I have illustrated a wheel comprising a hub 10, spokes 11, and felly 12. Shrunk upon the felly is a wheel rim 13, which is provided upon its inner surface with a plurality of substantially equally spaced transverse lugs 14, which are disposed in suitable slots formed in the periphery of the felly. The rim 13 is preferably secured to the felly by means of bolts extending through the countersunk holes 15 in the rim. The rim 13 is provided on the side thereof nearest the vehicle with a peripheral flange 16.

As illustrated in Figs. 1 to 3 inclusive, one of a pair of flying rings 17 is disposed around the wheel rim 13 and bears against the peripheral flange 16. As shown in the drawings the rings 17 are used in connection with a clencher tire. If it be desirable to use a tire other than a clencher, the disposition of the rings relatively to the tire are reversed. As shown most clearly in Fig. 3 the inner ring 17 engages the adjacent one of the beads 18 of a clencher tire casing 19. The inner tube of the tire is illustrated at 20. Disposed around the rim 13 and engaging the other bead 18 of casing 19, is a second flying ring 17. As most clearly illustrated in Fig. 2, the lugs 14 are provided with openings 21 extending longitudinally thereof and transversely of the rim 13. The rings 17 are held rigidly in engagement with the casing 19 by means of a locking ring 22. Provided with heads having flanges 23 conformed to engage the peripheral flange of the wheel rim 13, are male bolts 24 which are disposed in the holes 21 of the lugs 14. These bolts 24 are adapted to be threaded into the female bolts 25 projecting into the holes 14 from the side of the rim 13, opposite the vehicle. On the side of the rim 13 opposite the vehicle the said female bolts 25 are provided with hexagonal heads 26 adapted to be engaged by a wrench of any suitable type. I prefer to use a brace wrench for threading the bolts 25 into and out of engagement with the bolts 24. Loosely mounted upon the bolts 25, are plates 27 adapted to engage the locking ring 22 as clearly shown in Fig. 1. The said ring 22 is provided with an outside rib 28 of V-shaped cross-section, which is cut away at 29 to receive the plates 27. The ring 22 is preferably provided with lugs 30, conformed to fit and bear against the outside ends of the transverse lugs 14 of the rim 13.

In Fig. 8 I have illustrated a modified form of locking ring indicated at 22ᵃ wherein the means for positioning the plates 27 takes the form of a plurality of pins 28ᵃ. As clearly shown the male bolts 24 are provided with annular shoulders 31 adapted to fit snugly within the holes 21. These shoulders prevent vibration of the bolts, and consequently the crystallization and weakening of the parts which would naturally be the result of such vibration.

In order to secure a tire upon the rim 13 by means of the devices illustrated in Figs. 2 and 3, I proceed as follows: Assuming that the tire be of the "clencher" type, the inner ring 17 is disposed as shown in Fig. 3, and the bolts 25 are screwed partially out of engagement with the bolts 24. The tire is then positioned upon the rim 13 as accurately as possible and the outside ring 17 disposed against the adjacent bead 18. The locking ring 22 is then placed in the position shown in Fig. 1 with the plates 27 disposed in the cut away portions of the rib 28. The locking bolts 24 and 25 are then screwed into engagement drawing all of the parts into the positions shown in Fig. 3.

In case the wheel is to be used with a demountable tire rim it is provided with a plurality of tapered transverse slots 32 as shown in Figs. 4, 5, and 6, these slots being located at a plurality of points around the periphery of said rim. The said slots are designed to be engaged by correspondingly tapered lugs 33, formed upon the inner surface of a demountable rim 34.

Although in the drawings I have shown a demountable clencher rim, of course the demountable rim may be of any approved type, except that it be provided with the lugs 33 to engage the slots formed in the tire rim 13. The demountable rim 34 is drawn into position and retained in precisely the same manner as the outer flying ring, illustrated in Figs. 1 to 3 inclusive, is drawn into operative position and secured.

In Fig. 9 I have shown a modified form of wheel rim 13ᵃ, having tubes 14ᵃ, fused thereto forming transverse lugs to retain the locking bolts 24 and 25.

While I have illustrated my invention in the particular embodiments herein shown and described, I do not wish to be limited to these exact constructions, but desire to claim broadly any equivalents thereof which may suggest themselves to those skilled in the art.

What I claim and desire to secure by Letters Patent of the United States is:

1. A vehicle wheel comprising a felly, a rim thereon, said rim being provided with lugs disposed in slots in the periphery of the felly, a flange at one side of the periphery of said rim, holes through said lugs, a pair of tire-engaging rings disposed around said rim, a locking ring disposed on the side of the rim opposite said flange and a pair of coacting male and female bolts disposed in the hole through each of said lugs arranged to draw said locking ring toward said rim, one bolt of each pair engaging the locking ring and the other bolt engaging the rim.

2. A vehicle wheel comprising a felly, a flange located at one side of the periphery of the wheel, transverse holes through said felly, a locking ring located at the side of the wheel opposite said flange, a pair of coacting male and female bolts located in each of said holes, and a plate loosely carried by one of the bolts of each pair arranged to engage said locking ring, the other bolt of each pair engaging the opposite side of the wheel.

3. A vehicle wheel comprising a felly, a rim shrunk thereon, said rim being provided with a peripheral flange and a plurality of transverse lugs disposed in slots in said felly, a locking ring, a uniform bore through each of said lugs, and a pair of coacting male and female bolts disposed in each bore and arranged to draw said ring toward said flange, the male bolt of each pair being provided with an annular shoulder in said bore to prevent vibration of said male bolt, the female bolt fitting snugly within the bore.

In witness whereof, I hereunto subscribe my name this 12 day of February, A. D. 1913.

JOSEPH M. SCHEURICH.

Witnesses:
A. G. McCaleb,
Leslie W. Fricke.

Copies of this patent may be obtained for five cents each, by addressing the "Commissioner of Patents, Washington, D. C."